US008864862B2

(12) United States Patent
Gebhardt

(10) Patent No.: US 8,864,862 B2
(45) Date of Patent: Oct. 21, 2014

(54) COATED ABRASIVE GRAINS, METHOD AND FOR THE PRODUCTION THEREOF AS WELL AS THE USE THEREOF FOR PRODUCING ABRASIVES

(75) Inventor: Knuth Gebhardt, Drollobach (AT)

(73) Assignee: Center for Abrasives and Refractories Research & Development C.A.R.R.D. GmbH, Villach (AT)

( * ) Notice: Subject to any disclaimer, the term of this patent is extended or adjusted under 35 U.S.C. 154(b) by 343 days.

(21) Appl. No.: 12/287,737

(22) Filed: Oct. 14, 2008

(65) Prior Publication Data

US 2009/0100766 A1     Apr. 23, 2009

(30) Foreign Application Priority Data

Oct. 16, 2007   (EP) .................................... 07020212

(51) Int. Cl.
*C09G 1/02* (2006.01)
*B24D 18/00* (2006.01)
*B24D 3/00* (2006.01)
*C09K 3/14* (2006.01)

(52) U.S. Cl.
CPC ............... *B24D 3/00* (2013.01); *C09K 3/1427* (2013.01); *B24F 11/00* (2013.01); *C09K 3/1409* (2013.01); *C09K 3/1436* (2013.01)
USPC .................. 51/309; 51/307; 51/308

(58) Field of Classification Search
USPC ............................................ 51/307, 308, 309
See application file for complete search history.

(56) References Cited

U.S. PATENT DOCUMENTS

| | | | |
|---|---|---|---|
| 2,527,044 A | 10/1950 | Walton et al. ................... | 51/308 |
| 4,278,449 A | 7/1981 | Helletsberger et al. ......... | 51/309 |
| 4,311,489 A | 1/1982 | Kressner ......................... | 51/298 |
| 4,472,173 A | 9/1984 | Bruning et al. ................. | 51/298 |
| 5,352,427 A | 10/1994 | Davidovits et al. ............ | 423/328.1 |
| 6,066,189 A * | 5/2000 | Meyer et al. .................... | 51/298 |
| 7,097,679 B2 | 8/2006 | Wurzer et al. | |
| 7,381,466 B2 | 6/2008 | Zeiringer et al. | |
| 2004/0221515 A1 * | 11/2004 | McArdle et al. ............... | 51/308 |
| 2005/0032469 A1 * | 2/2005 | Duescher ....................... | 451/548 |
| 2006/0134421 A1 * | 6/2006 | Zeiringer et al. ............. | 428/403 |

FOREIGN PATENT DOCUMENTS

| | | | | |
|---|---|---|---|---|
| DE | 31 47 597 C1 | 2/1983 | ............. | C04B 31/16 |
| DE | 102 57 554 A1 | 7/2004 | ............. | B24D 3/00 |
| EP | 0 014 236 A1 | 11/1979 | ............. | B24D 3/00 |
| EP | 0 014 236 A1 | 8/1980 | ............. | B24D 3/00 |
| EP | 0 518 962 B1 | 12/1992 | ............. | C04B 12/00 |
| JP | 04-292632 | 10/1992 | | |
| JP | 06-015967 | 1/1994 | | |
| JP | 09-267263 | 10/1997 | | |
| JP | 2002-220583 A | 8/2002 | | |
| JP | 2003-117836 A | 4/2003 | | |
| JP | 2003-277732 A | 10/2003 | | |
| WO | WO 2004-053013 A2 | 6/2004 | | |
| WO | WO 2004/053013 A2 | 6/2004 | ............. | C09K 3/14 |

OTHER PUBLICATIONS

J. Davidovits: Solid phase synthesis of a mineral blockpolymer by low temperature polycondensation of aluminosilicate polymers.
English Translation of Office Action issued in corresponding Japanese Application No. 2008-238495, dated Feb. 25, 2013.

* cited by examiner

*Primary Examiner* — Elizabeth Wood
(74) *Attorney, Agent, or Firm* — Finnegan, Henderson, Farabow, Garrett & Dunner, L.L.P.

(57) ABSTRACT

The present invention relates to abrasive grains, which are coated with a micro-particle inorganic powder and a binder, consisting of the group of conventional abrasive grains as well as the group of the "superabrasives", wherein the binder comprises an aluminosilicate with a molar ratio of $Al_2O_3$ to $SiO_2$ of 1:2 to 1:20 as well as at least one complex alkaline fluoride. The particular advantage of this coating is that the binder can already be completely hardened at below 400° C. The invention also relates to a method for producing such abrasive grains as well as to the use thereof for producing abrasives.

34 Claims, No Drawings

COATED ABRASIVE GRAINS, METHOD AND FOR THE PRODUCTION THEREOF AS WELL AS THE USE THEREOF FOR PRODUCING ABRASIVES

CROSS-REFERENCE TO RELATED APPLICATIONS

Pursuant to 35 U.S.C. §119 or §365, this application claims priority to European Patent Application No. 07 020 212.2 filed Oct. 16, 2007, titled Ummantelte Schleifkörner, Verfahren zu ihrer Herstellung sowie ihre Verwendung zur Herstellung von Schleifmitteln.

FIELD OF THE INVENTION

The present invention relates to abrasive grains from the group of conventional abrasive grains, such as, e.g., aluminum oxide, fused aluminum oxide, sintered aluminum oxide, zirconium aluminum oxide, carbon silicide and boron carbide, as well as from the group of the superabrasives, such as, e.g., cubic boron nitride and diamond and/or mixtures thereof, which are coated with an inorganic binder and a micro-particle inorganic powder. The present invention also relates to a method for the production of such abrasive grains as well as to the use thereof in abrasives.

BACKGROUND OF THE INVENTION

Abrasive grains with the most different grain sizes, in bound and loose form, are used for the most diverse grinding processes, with which all of the known materials can be processed. The use of abrasive grains in bound form differentiates between the so-called bonded abrasives, which are understood to be grinding wheels, abrasive stones or also mounted wheels, with which the abrasive grains are formed into the corresponding abrasive by means of a ceramic mass or by means of a synthetic resin and are subsequently solidified by means of a heat treatment as well as the coated or flexible abrasives, respectively, with which the abrasive grains are fixed on a support (paper or textile) by means of a binder (synthetic resin).

The efficiency of the different abrasives does not only depend on the abrasive grain, which is used, but it also largely depends on the integration of the abrasive grain in the abrasive. Particular importance is thereby accorded to the interface between abrasive grain and binder phase, because said interface determines the force, which is necessary for breaking an abrasive grain out of a bond. The harder and more ductile an abrasive grain, the higher the demands on the bond and on the adhesive forces at the interfaces. Most of the abrasive grains, in particular those produced by means of a melting process, have a relatively smooth surface, which has proven to be disadvantageous for the integration. Grinding operations where more than 50% of the abrasive grain is lost by breaking out of the bond are thus not a rarity and are thus not used at all for the actual grinding application.

In the past, a plurality of methods for respectively roughening and increasing the surface of the abrasive grain and thus for improving its integration have been proposed and taken. Most of these methods are based on applying micro-particle pigments or powder onto the surface of the abrasive grain and to firmly bond them with the abrasive grain. For this purpose, the surface of the abrasive grain is generally wetted with a binder and is subsequently mixed with an inorganic pigment or powder so that, if possible, the grain surface is evenly and homogenously coated with a layer of micro particles. Subsequently, the abrasive grains, which are treated in such a manner, are subjected to a heat treatment, in response to which the bond between fine grain particles and abrasive grain is solidified.

Silica-based binders, such as, e.g., sodium silicate or colloidal silicon dioxide are frequently used as binders. A disadvantage of this treatment is that relatively high temperatures are required for achieving a solidification of the binder so that not only a relatively high amount of energy is used for such treatments, but so that temperature-sensitive abrasive grains are also excluded from a coating of this type.

U.S. Pat. No. 2,527,044 A describes a fused aluminum oxide or silicon carbide abrasive grain, which is coated with a coating consisting of fine-grain metal oxide particles, for example iron(3)oxide or molybdenum oxide for the purpose of improving the integration, in particular in synthetic resin-bound abrasives. In this case, a low-melting glass frit is used as a binder and the temperature of the oxidizing heat treatment lies between 1350° and 1500° F., which corresponds to a temperature of 732° C. to 1222° C. Such a treatment is not suitable for temperature-sensitive and/or oxidation-sensitive abrasive grains, such as, e.g., eutectic zirconium aluminum oxide, cubic boron nitride or diamond.

EP 0 014 236 A1 describes the treatment of abrasive grain on the basis of aluminum oxide, wherein a layer consisting of a ceramic mass, such as, e.g., clays, kaolin or glass frits, is melted or sintered onto the abrasive grain. At the same time, a conversion of the titanium oxide included in the aluminum oxide is to take place from the trivalent to the tetravalent oxidation stage by means of the sintering or melting of the coating. This coating method is thus exclusively suitable for abrasive grains, which encompass portions of titanium oxide in addition to aluminum oxide. In addition, the heat treatment is to occur at a temperature of from 1250° C. to 1350° C. and is to take place under oxidizing conditions so that this treatment can also not be considered for oxidation and temperature-sensitive abrasive grains.

Low temperatures for the heat treatment can be realized by means of phosphate binders or organic binders, such as, e.g., synthetic resin. However, these binders have the disadvantage that they have a relatively low adhesive power to the abrasive grain and the stability of the coating on the surface is thus inadequate.

DE 102 57 554 A1 describes abrasive grains from the group of the conventional abrasive grains, in particular melted or sintered aluminum oxides, zirconium aluminum oxides, silicon carbide and boron carbide for use in synthetic resin-bound abrasives, the surface of which is provided with a coating consisting of an aqueous binder on the basis of silicate and a fine-grain oxide compound. The fine-grain oxide compound is a complex compound of the general formula $A_xB_yO_z$ with one element A from the group of metals and one element B from the group of amphoteric elements as well as oxygen in the stoichiometric ratio to A and B.

For the heat treatment, provision is made for a temperature range between 100° C. and 900° C. and, after a heat treatment of the coated abrasive grain at 400° C., considerably increased performances can be achieved in comparison to an untreated abrasive grain. More accurate tests of abrasive grains, which are treated in such a manner, in particular the determination of the bond strength by means of acoustic cavitation, have shown that the bond of the oxide compound at the surface is relatively weak and that these increased performances have been achieved even though the bond of the coating at the abrasive grain surface is weak and the increased performances can possibly be ascribed to the crystal structure of the pigment (rutile lattice) and the composition of the pigment comprising an amphoteric element, which possibly supports the grinding process as auxiliary abrasive.

Furthermore, the problem thus exists of finding a binder system for a coating of abrasive grains, which does not encompass the disadvantages of the state of the art and which forms a firm bond with the abrasive grain surface already at low temperatures. With such a binder system, it should be possible to achieve further improvements of the grinding performances, in particular for thermally unstable abrasive grains. In particular the treatment of eutectic zirconium aluminum oxide, the pyrolysis of which starts at temperatures of above 400° C. caused by modification conversions of the zirconium oxide and volume changes connected therewith, lies in the center of interest.

SUMMARY OF THE INVENTION

The object is solved by means of coated abrasive grains comprising a binder system with the features of claim 1. Preferred embodiments are the object of the subclaims.

It is also the object of the invention to provide a method for producing such coated abrasive grains as well as to present the use of the coated abrasive grains in abrasives.

DETAILED DESCRIPTION OF THE PREFERRED EMBODIMENTS

In 1976, a new type of ceramic materials was already described in the publication J. Davidovits: Solid phase synthesis of a mineral blockpolymer by low temperature polycondensation of aluminosilicate polymers. I.U.P.A.C. International Symposium on Macromolecules, Stockholm; September 1976; Topic III, New Polymers of high stability. (1976), which later became known under the term geopolymers. A group of aluminosilicate materials, which can be produced similarly to organic polymers via a polycondensation process, but which are thereby of a purely inorganic nature and thus encompass a high thermal and chemical stability are referred to as geopolymers. The basic modules of the geopolymers form $SiO_4$ and $AlO_4$ tetrahedrons, which cluster in three-dimensional nets in response to the geopolymerization.

EP 0 518 962 B1 describes binders on the basis of geopolymers, which, in addition to the silicate and aluminate groups, comprise at least one complex alkaline fluoride, which reduces the hardening speed of the geopolymers and thus controls the polycondensation.

Until now, experts have not considered and used, respectively, geopolymers as binders for coatings for abrasive grains, because the formation of geopolymers requires a high solid concentration, wherein the concentration of the dry substance must be above 60 percent by weight so that a polycondensation runs. However, highly water-diluted binders are typically used for the coating of abrasive grains so as to obtain a homogenous and thin coating of the surface by means of binders. Typically, diluted industrial sodium silicates or colloidal silicon dioxides are used for this purpose, the solids content of which lies far below the 60 percent by weight, which is required for the geopolymers.

Surprisingly, it was now found that, with the help of a binder mixture containing reactive $Al_2O_3$ and $SiO_2$ (aluminosilicate) and being water-diluted, it is possible, at temperatures of below 400° C., to apply an extremely firmly adhering coating onto the surface of abrasive grains, into which the micro-particle inorganic powders and inorganic oxidic pigments, respectively, can be integrated for the purpose of increasing the surface. This was even more surprising because solid dense geopolymers are typically not formed with the ratio of $Al_2O_3$ to $SiO_2$ as claimed in the invention, but purely viscous silicate phases are formed, which do not participate in the three-dimensional network and which typically swell and form bubbles in response to the heating so that in this case, a porous body is typically created at temperature of above 300° C.

Metakaolines, flue ashes, slags, rock dust, fine sands and activated clays are used as source materials for the aluminosilicate. These materials consist of extremely fine particles and have a sufficient activity for forming aluminosilicate-based gels by means of polycondensation reactions of the silica-based and aluminosilicate-based components. However, in addition to these raw materials, which accumulate in large quantities as byproducts and waste products of the energy generation and from the raw material industry, any other materials, which contain aluminum oxide and silicon oxide in a sufficient quantity and in a sufficiently reactive form, can also be used for triggering the polycondensation reaction and to form a three-dimensional network consisting of $SiO_4$ and $AlO_4$ tetrahedrons. It was thus shown that, instead of the aluminum silicate, a reactive aluminum oxide and aluminum hydroxides, respectively, can also be used together with $SiO_2$-rich sodium silicates.

In addition to the aluminosilicate, which is preferably used in a molar ratio of $Al_2O_3$ to $SiO_2$ of 1:2 to 1:20, the binder system includes sodium silicate, water and, in a preferred embodiment of the present invention, at least one complex alkaline fluoride. Based on the untreated abrasive grain, approx. 0.01 to approx. 10.0 percent by weight of binders are used thereby, wherein the binder is made up of approx. 0.005 to approx. 4.0 percent by weight of sodium silicate, approx. 0.005 to approx. 4.0 percent by weight of water, approx. 0.005 to approx. 1.0 percent by weight of aluminosilicate and approx. 0.001 to approx. 1.0 percent by weight of complex alkaline fluoride, wherein the percentages each refer to the untreated abrasive grain. The chemical composition of the base mixture (i.e., precursor) of the binder is approximately 5 to approximately 30 percent by weight of $SiO_2$, approximately 60 to approximately 90 percent by weight of $H_2O$, approximately 1 to approximately 10 percent by weight of $Al_2O_3$ and, in a preferred embodiment, approximately 5 to approximately 15 percent by weight of alkaline fluoride.

The at least one complex alkaline fluoride is chosen from the group $Na_3AlF_6$, $K_2NaAlF_6$, $Na_2SiF_6$, $K_2SiF_6$, $NaBF_4$ and $KBF_4$.

In addition to the above-listed components, the binder can also comprise fillers and/or grinding additives. For this purpose, all of the known fillers and grinding additives from the group of sulfides, phosphates, carbonates and/or halogenides and/or sulfide, phosphate, carbonate and/or halogenide-containing complex compounds from the group of the elements sodium, lithium, potassium, magnesium, calcium, aluminum, manganese, copper, zinc, iron, titanium, antimony and/or tin can be used.

The micro-particle inorganic powder is typically an oxide pigment, approx. 0.05 to approx. 5.0 percent by weight of which, based on the untreated abrasive grain, is used, wherein a preferred embodiment of the present invention provides for a quantity of approx. 0.1 to approx. 2.0 percent by weight of micro-particle inorganic powder, based on the untreated abrasive grain.

The binder can be hardened at temperatures of below 400° C. and under these conditions reaches an extraordinary stability, which clearly lies above the stabilities, which are achieved with binders according to the state of the art at these temperatures.

The coating method itself is relatively uncomplicated, wherein the abrasive grains are initially wetted with the binder in an intensive mixer. Subsequently, the wetted abrasive grains are mixed with a micro-particle inorganic powder and are mixed until the micro-particle inorganic powder is evenly distributed on the surface of the abrasive grains. The hardening of the coating is carried out at a temperature below 400° C., for example in a rotary furnace.

The coated abrasive grains, which are produced in such a manner, are used for the production of abrasives, in particular of coated abrasives.

The present invention will be explained in detail below by means of examples.

EXAMPLES

Determination of the Bond Strength

In the case of a coated abrasive grain, the quality of the binder, that is, the stability with which the pigment is bound, can be evaluated by means of acoustic cavitation. With this method, the treated abrasive grain is covered with water in a glass vessel and is exposed to ultrasonic waves. The intensive exposure creates small vacuum bubbles, so-called cavitations, which implode in particular at the surfaces of solid state bodies and thereby abruptly create high temperatures and pressures, so-called "microjets". With these "microjets", slightly bound particles are loosened and severed at the abrasive grain surface. The quantity of severed particles is then determined as nephelometric turbidity unit (NTU value) in the decanted suspension by means of photometric methods.

Examples 1 and 2, Comparative Examples 1 and 2

1 kilogram of abrasive grain (eutectic zirconium aluminum oxide, Alodur ZK40 P 36, Treibacher Schleifmittel) comprising a binder system was produced in a laboratory rotary-drum mixer and was mixed for 5 minutes. Subsequently, a pigment was added and the abrasive grain with binder and pigment was mixed for another 5 minutes. The raw material obtained in this manner was then air-dried for 20 minutes and was subsequently thermally treated for 15 minutes in a rotary furnace at 350° C.

In each case, 5 grams of the abrasive grain, which was coated in such a manner, was covered with 10 ml of water in a snap-on lid glass and was treated for one minute with ultrasound in an ultrasonic bath (Haver USC 200). The pigment concentration in the remaining water was subsequently determined as NTU value by means of a photometer (WTW Turbo 550). In this test series, potassium silicate 42/43 (Mörsil H, Cognis Deutschland GmbH) was used as sodium silicate, metakaolin (Metastar 501, Imerys Minerals Ltd.) was used as aluminosilicate, $K_2SiF_6$ (Brenntag CEE GmbH) was used as alkaline fluoride as well as PK 12100 (Ferro Corp.) with the approximate composition of 10 percent by weight of $MnO_2$, 24 percent by weight of $Sb_2O_3$ and 66 percent by weigh of $TiO_2$ as oxide pigment.

The binder composition as well as the photometric measuring results (NTU value; inversely proportional to the bond strength) are summarized in table 1.

TABLE 1

| | Binder Composition (g) | | | | Oxide Pigment (g) | NTU value |
|---|---|---|---|---|---|---|
| Sample | Sodium silicate | Water | Alumino-silicate | Alkaline fluoride | | |
| Example 1 | 3.6 | 2.4 | 0.15 | 0.3 | 2.0 | 550 |
| Comparative Example 1 | 3.6 | 2.4 | — | 0.3 | 2.0 | 902 |
| Comparative Example 2 | 3.6 | 2.4 | — | — | 2.0 | >>1000 |
| Example 2 | 3.6 | 2.4 | 0.15 | — | 2.0 | 817 |

From the results of table 1 it can be seen that the bond strength of the coating in example 1 as claimed in the invention clearly lies above the value of the comparative examples. The comparative example 1 thereby corresponds to a conventional coating according to the state of the art with sodium silicate, wherein a complex alkaline fluoride was additionally added to the binder. Comparative example 2 corresponds to a purely conventional coating with sodium silicate as binder and an oxide pigment without further additions. Example 2 does without the alkaline fluoride. The NTU values of the above table show that the effect of the aluminosilicate as binder for the coating of an abrasive grain thrives in particular in combination with an alkaline fluoride.

Examples 3 to 13

Again, as in example 1, 1 kilogram of abrasive grain (eutectic zirconium aluminum oxide, Alodur ZK40 P 36, Treibacher Schleifmittel) comprising a binder system was produced in a laboratory rotary-drum mixer and was mixed for 5 minutes. Subsequently, the pigment (PK 12100, Ferro Corp.) was added and the abrasive grain with binder and pigment was mixed for another 5 minutes. Subsequently, the mixture obtained in this manner was air-dried for 20 minutes and was then thermally treated for 15 minutes in the rotary furnace at 350° C.

In each case, 5 grams of the abrasive grain, which was coated in such a manner, was covered with 10 ml of water in a snap-on lid glass and was treated for one minute with ultrasound in an ultrasonic bath (Haver USC 200). The pigment concentration in the remaining water was subsequently determined as NTU value by means of a photometer (WTW Turbo 550).

In this test series, potassium silicate 42/43 (Mörsil H, Cognis Deutschland GmbH) was used as sodium silicate, metakaolin (Metastar 501, Imerys Minerals Ltd.) was used as source for aluminosilicate, $K_2SiF_6$ (Brenntag CEE GmbH) was used as alkaline fluoride and PK 12100 (Ferro) was used as oxide pigment.

The binder composition as well as the photometric measuring results (NTU value; inversely proportional to the bond strength) are summarized in table 2.

TABLE 2

| | Binder Composition (g) | | | | Oxide Pigment (g) | NTU value |
|---|---|---|---|---|---|---|
| Sample (1 kg) | Sodium silicate | Water | Alumino-silicate | Alkaline fluoride | | |
| Example 3 | 3.6 | 2.4 | 0.05 | 0.3 | 2.0 | 557 |
| Example 4 | 3.6 | 2.4 | 0.1 | 0.3 | 2.0 | 452 |
| Example 5 | 3.6 | 2.4 | 0.3 | 0.3 | 2.0 | 196 |
| Example 6 | 3.6 | 2.4 | 0.6 | 0.3 | 2.0 | 364 |
| Example 7 | 3.6 | 2.4 | 1.0 | 0.3 | 2.0 | 489 |

TABLE 2-continued

| Sample (1 kg) | Sodium silicate | Water | Alumino-silicate | Alkaline fluoride | Pigment (g) | NTU value |
|---|---|---|---|---|---|---|
| Example 8 | 3.6 | 2.4 | 0.3 | 0.0 | 2.0 | 789 |
| Example 9 | 3.6 | 2.4 | 0.3 | 0.15 | 2.0 | 268 |
| Example 10 | 3.6 | 2.4 | 0.3 | 0.6 | 2.0 | 241 |
| Example 11 | 3.6 | 2.4 | 0.3 | 0.9 | 2.0 | 406 |
| Example 12 | 3.6 | 2.4 | 0.3 | 1.2 | 2.0 | 529 |
| Example 13 | 3.6 | 2.4 | 0.1 | 0.9 | 2.0 | 307 |

From the results of table 2 it can be seen that the quantities of aluminosilicate and complex fluoride can be varied across a relatively wide range, without resulting in a decrease of the bond strength. For the aluminosilicate, the optimal range for the coating of a relatively coarse abrasive grain (P 36) comprising an average grain diameter of approx. 500 μm seems to lie between approx. 0.001 and approx. 0.006 percent by weight and the optimal range for the complex alkaline fluoride seems to lie between approx. 0.003 and approx. 0.01 percent by weight, based on the abrasive grain. Correspondingly larger quantities of binder mixture must be used for finer abrasive grains, which encompass a correspondingly larger surface per kg of abrasive grain.

It can be seen from example 8 that the lack of the complex alkaline fluoride has a very strong effect on the bond strength. As is shown in example 3, small quantities of aluminosilicate are already sufficient for achieving a considerable increase of the bond strength, if alkaline fluoride is present.

Examples 14 and 15, Comparative Example 3

In examples 14 and 15 the abrasive grain type was varied, wherein carbon silicide and aluminum oxide white have been used as an alternative to the zirconium aluminum oxide as conventional abrasive grains.

Again, 1 kilogram of conventional abrasive grain comprising a binder system was produced in a laboratory rotary-drum mixer and was mixed for 5 minutes. Subsequently, the pigment was added and the abrasive grain with binder and pigment was mixed for another 5 minutes, wherein the binder mixture and the oxide pigment were used analogously to example 4. The material obtained in this manner was then air-dried for 20 minutes and was subsequently thermally treated for 15 minutes in the rotary furnace at 350° C.

The bond strength was determined analogously to the above-described examples. In this test series, regular aluminum oxide (Alodur ESK P 36, Treibacher) and SiC (Alodur SiC, P 36, Treibacher) were used as abrasive grains. In the comparative example 5, regular aluminum oxide was conventionally coated with sodium silicate and oxide pigment.

The binder composition as well as the photometric measuring results (NTU value; inversely proportional to the bond strength) are summarized in table 3.

TABLE 3

| Sample (1 kg) | Sodium silicate | Water | Alumino-silicate | Alkaline fluoride | Oxide Pigment (g) | NTU value |
|---|---|---|---|---|---|---|
| Example 14 SiC | 3.6 g | 2.4 g | 0.3 g | 0.3 g | 2.0 g | 438 |
| Example 15 ESK | 3.6 g | 2.4 g | 0.3 g | 0.3 g | 2.0 g | 523 |
| Comparative Example 3 ESK | 3.6 g | 2.4 g | — | — | 2.0 g | >>1000 |

The results in table 3 show that the results achieved with zirconium aluminum oxide can also be transferred to other conventional types of abrasive grain, such as, e.g. silicon carbide or regular aluminum oxide.

Examples 16 and 17, Comparative Examples 4 and 5

CBN, Diamond

In each case, 500 carat of cubic boron nitride (SBN-B B 151; mesh, Showa Denko KK) and 500 carat diamond (RVG D 126; mesh, Diamond Innovation), respectively, comprising a binder system, which is analogous to example 4, were produced in a special laboratory mixer and were intensely mixed for 5 minutes. Subsequently, the pigment was added and the abrasive grain with binder and pigment was mixed for another 5 minutes. The mixture obtained in this manner was then air-dried for 20 minutes and was subsequently thermally treated for 15 minutes in the rotary furnace at 350° C.

The binder stability was determined analogously to the above-listed examples by means of the acoustic cavitation.

The binder composition as well as the photometric measuring results (NTU value; inversely proportional to the bond strength) are summarized in table 4.

TABLE 4

| Sample (500 ct) | Sodium silicate | Water | Alumino-silicate | Alkaline fluoride | Oxide Pigment (g) | NTU value |
|---|---|---|---|---|---|---|
| Example 14 Diamond | 2.0 g | 1.0 g | 0.15 g | 0.15 g | 1.0 g | 812 |
| Example 15 CBN | 2.0 g | 1.0 g | 0.15 g | 0.15 g | 1.0 g | 734 |
| Comparative Example 6 Diamond | 2.0 g | 1.0 g | — | — | 1.0 g | >>1000 |
| Comparative Example 7 CBN | 2.0 g | 1.0 g | — | — | 1.0 g | >>1000 |

Calculated for a portion of the abrasive grain, approximately a fivefold of the quantity of binder composition was used in response to the treatment of the superabrasives CBN and diamond, which is explained by the fact that, in this case, a grain size comprising an average grain diameter of approx. 100 μm was used and that for each weight unit of abrasive grain an equally larger surface was to be treated. Altogether, calculated for the surface, a quantity of binder was used, which is comparable to the conventional abrasive grains. The results in table 4 show that even with the superabrasives, relatively high bond strengths can be achieved under mild reaction conditions with the binder system as claimed in the invention. However, said bond strengths turn out to be slightly less strong in comparison to the conventional abrasive grains, which could possibly be caused by the fact that with the conventional abrasive grains a stronger bond occurs at the abrasive grain surface via oxygen bridges.

Examples 18 to 21

In the test series with examples 18 to 21, flue ash (Holcim AG, Deutschland) and a mixture of reactive aluminum hydroxide (Pseudoböhmit, Sasol Germany) and reactive silicon oxide (highly disperse silicon dioxide HDK, Wacker Chemie AG), respectively, were used as the base materials for aluminosilicate. Within the scope of these tests, sodium aluminum fluoride (Solvay Fluor GmbH) was additional chosen as an alternative to the potassium silicon fluoride as a complex fluoride.

In each case, 1 kilogram of eutectic zirconium aluminum oxide (Alodur ZK40 P 36, Treibacher Schleifmittel) comprising a binder system analogously to example 4 was produced in a laboratory rotary-drum mixer and was mixed for 5 minutes. Subsequently, the pigment was added and the abrasive grain with binder and pigment was mixed for another 5 minutes. The raw material obtained in this manner was then air-dried for 20 minutes and was subsequently thermally treated for 15 minutes in a rotary furnace at 350° C.

In each case, 5 grams of the abrasive grain, which was coated in such a manner, was covered with 10 ml of water in a snap-on lid glass and was treated for one minute with ultrasound in an ultrasonic bath (Haver USC 200). The pigment concentration in the remaining water was subsequently determined as NTU value by means of a photometer (WTW Turbo 550). In this test series, potassium silicate 42/43 (Mörsil H, Cognis Deutschland GmbH) was used as sodium silicate, flue ash (Holcim AG, Deutschland) and a mixture of reactive aluminum hydroxide (Pseudomöhbit, Sasol Germany) and reactive silicon oxide (highly disperse silicon dioxide HDK, Wacker Chemie AG), respectively, were used as the source for aluminosilicate and sodium aluminum fluoride (Solvay Fluor GmbH) as an alternative to the potassium silicon fluoride as a complex fluoride.

The exact binder composition as well as the photometric measuring results (NTU value; inversely proportional to the bond strength) are summarized in table 5.

TABLE 5

| Sample (1 kg) | Binder Composition | | | | |
|---|---|---|---|---|---|
| | Sodium silicate | Water | Alumino-Silicate (0.3 g) | Alkaline fluoride (0.3 g) | Oxide Pigment (g) | NTU value |
| Example 18 | 3.6 g | 2.4 g | Flue ash | $K_2SiF_6$ | 2.0 g | 315 |
| Example 19 | 3.6 g | 2.4 g | Böhmit + HDK | $K_2SiF_6$ | 2.0 g | 345 |
| Example 20 | 3.6 g | 2.4 g | Metakaolin | $Na_3AlF_6$ | 2.0 g | 220 |
| Example 21 | 3.6 g | 2.4 g | Böhmit + HDK | $Na_3AlF_6$ | 2.0 g | 433 |

The results in table 5 show that, in addition to metakaolin, other reactive raw materials can also be used as base materials for geopolymers consisting of $Al_2O_3$ and $SiO_2$, for obtaining a solid bond on the abrasive grain surface under mild conditions.

Grinding Tests
Abrasive Belt Grinding 1

On the basis of selected samples (example 3, example 5, untreated ZK40), experimental abrasive belts (cloth back with synthetic resin bond) were produced, with which common construction steel (ST37) and high-quality steel (V2A), respectively, were processed. The grinding performance was determined as removal (g) per time unit (min). The results of the grinding test are summarized in table 6.

TABLE 6

| | ST 37 (steel pipe) Grinding time 12 min | | V2A-surface Grinding time 30 min | |
|---|---|---|---|---|
| Sample | Removal | Performance | Removal | Performance |
| Example 5 | 982 g | 147% | 739 g | 164% |
| Example 3 | 854 g | 127% | 615 g | 137% |
| ZK 40 untreated | 670 g | 100% | 450 g | 100% |

As can be seen from the results in table 6, the coating made it possible to achieve considerable performance increases in comparison to the uncoated abrasive grain. A subsequent optical analysis of the belts made it clear that the performance increase is primarily ascribed to the fact that a much smaller grain shedding was registered for the belts, which were produced under the same conditions by means of the abrasive grains, which are coated as claimed in the invention.

Abrasive Belt Grinding 2

A full material comprising a diameter of 30 mm was also processed with synthetic resin-bonded textile belts at a grinding pressure of 35N with a grinding time of 50 minutes. C45 steel and high-quality steel V2A were used as basic materials. The results of the grinding tests are summarized in table 7.

TABLE 7

| | Removal (g) | | Grinding Performance (%) | |
|---|---|---|---|---|
| Sample | C45 | V2A | C45 | V2A |
| Example 5 | 5332 | 1649 | 132 | 141 |
| Example 3 | 5009 | 1392 | 124 | 119 |
| ZK40 untreated | 4040 | 1170 | 100 | 100 |

The results in table 7 also show a considerable performance increase for the belts comprising abrasive grain, which was coated as claimed in the invention. Due to the fact that the belts in this test have been ground to their performance limit, the subsequent optical analysis no longer shows large differences between the individual belts. However, by means of a removal curve for each time unit, it was possible to determine that the belts comprising untreated zirconium aluminum oxide were worn out considerably faster.

Belt Grinding 3

Stainless steel as well as construction steel was also processed as materials under different stresses and for different periods with synthetic resin-bonded textile grinding belts. The results of the test series are summarized in table 8.

TABLE 8

| | SUS304 stainless steel, High stress, 5 min | | S50C constructional steel, Average stress, 30 min | |
|---|---|---|---|---|
| Sample | Removal | Performance | Removal | Performance |
| Example 5 | 797 g | 145% | 3758 g | 131% |
| Example 3 | 687 g | 125% | 3243 g | 113% |
| ZK40 untreated | 550 g | 100% | 2870 g | 100% |

The results in table 8 show that, in particular in response to high stresses as well as in response to the processing of materials, which are hard to grind (stainless steel), the advantages of the abrasive grains, which are coated as claimed in the invention, come to bear.

Cut-Off Wheel Tests
Cut-Off Wheel Production

In each case, 5 cut-off wheels were produced from abrasive grains according to example 5 and example 3 as well as with untreated eutectic zirconium aluminum oxide ZK40, wherein, in each case, 780 g of abrasive grain were mixed with 55 g of liquid resin (phenolic resin) and this mixture was subsequently mixed with 240 g of a powder mixture consisting of 50.0 percent by weight of phenol powder resin, 25.0 percent by weight of cryolite, 24.0 percent by weight of pyrite and 1.0 percent by weight of CaO. Subsequently, a corresponding portion of the mixture was, in each case, pressed into wheels comprising a diameter of 178 mm and a strength of 2.8 mm and was hardened within 14 hours at 180° C.

Test Parameter (Separating Test)

| Wheel diameter: | 178 mm |
|---|---|
| Speed: | 8.000 rpm |
| Feed rate: | 2.0 cm/s |

After the wheels have initially been deburred by three cuts, 20 cuts were performed per cutting wheel wherein a processing time of 5.5 seconds was scheduled for each cut. The following materials were processed thereby.
Materials: Flat steel V2A (18% Cr, 10% Ni) 30 mm×8 mm
Round steel, ST 37, 20 Ø

In each case, the G-ratio was computed after 20 cuts from the average value of the 5 wheels, according to the formula:

$$\frac{\text{Cut surface of the material}}{\text{Surface loss of the cut-off wheel}} = \text{G-ratio}$$

The test results for the processing V2A are summarized in table 9 and the results for the processing of constructional steel ST 37 are summarized in table 10:

TABLE 9

| V2A | Cut Surface (mm$^2$) | Wheel loss (mm$^2$) | G-ratio |
|---|---|---|---|
| Example 4 | 4800 | 182 | 26.4 |
| Example 2 | 4800 | 215 | 22.3 |
| ZK40 untreated | 4800 | 350 | 13.7 |

TABLE 10

| ST 37 | Cut Surface (mm$^2$) | Wheel loss (mm$^2$) | G-ratio |
|---|---|---|---|
| Example 4 | 6280 | 165 | 38.1 |
| Example 2 | 6280 | 197 | 31.9 |
| ZK40 untreated | 6280 | 259 | 24.2 |

It can be seen in both processing cases that a considerable increase of the G-ratio is achieved with the coating as claimed in the invention. Due to the fact that the number of cuts for all of the samples was the same for both of the above-mentioned processing cases and the materials as well as the base abrasive grain were identical, the higher G-ratio can be ascribed almost exclusively to the respectively lower wheel loss, which, in turn, is only a function of the integration of the grain. Due to the fact that the same binder compositions were also used in each case, the results listed in tables 9 and 10 allow for direct conclusions relating to the quality of the coating.

Although this invention has been described and illustrated by reference to specific embodiments, it will be apparent to those skilled in the art that various changes and modifications may be made which clearly fall within the scope of this invention. The present invention is intended to be protected broadly within the spirit and scope of the appended claims.

I claim:

1. Abrasive grains selected from the group consisting of aluminum oxide, fused aluminum oxide, sintered aluminum oxide, alumina zirconia, silicon carbide, boron carbide, cubic boron nitride, diamond and mixtures thereof, the abrasive grains having a geopolymeric coating, the coating comprising a binder and a micro-particle inorganic powder, the binder comprising:
   an aluminosilicate with a molar ratio of $Al_2O_3$ to $SiO_2$ of 1:2 to 1:20,
   sodium silicate, and
   water,
   wherein the precursor to the binder is a water-diluted base mixture of approximately 60 percent to approximately 90 percent by weight of water,
   wherein the coating is applied directly to the abrasive grains, and
   wherein the coated abrasive grains have an NTU-value ranging from 196 to 817.

2. The abrasive grains according to claim 1, wherein the binder additionally comprises at least one complex alkaline fluoride.

3. The abrasive grains according to claim 2, wherein the chemical composition of the precursor to the binder is approximately 5 to approximately 30 percent by weight of $SiO_2$, approximately 1 to approximately 10 percent by weight of $Al_2O_3$ and approximately 5 to approximately 15 percent by weight of alkaline fluoride.

4. The abrasive grains according to claim 1, wherein the portion of the binder is approximately 0.01 to approximately 10.0 percent by weight, based on the untreated abrasive grain.

5. The abrasive grains according to claim 4, wherein the binder is made up of approximately 0.005 to approximately 4.0 percent by weight of water glass, approximately 0.005 to approximately 4.0 percent by weight of water, approximately 0.0005 to approximately 1.0 percent by weight of aluminosilicate and approximately 0.001 to approximately 1.0 percent by weight of alkaline fluoride, in each case based on the untreated abrasive grain.

6. The abrasive grains according to claim 5, wherein the aluminosilicate is chosen from at least one of the group consisting of metakaolins, flue ashes, slags, fine sands and activated clays.

7. The abrasive grains according to claim 6, wherein the aluminosilicate comprises a product of reactive $Al_2O_3$ and reactive $SiO_2$, which was created in situ in response to coating said abrasive grains.

8. The abrasive grains according to claim 7, wherein the aluminosilicate is a gel formed by polycondensation of reactive $Al_2O$ and reactive $SiO_2$ comprising a three-dimensional network of $SiO_4$ and $AlO_4$ tetrahedrons.

9. The abrasive grains according to claim 8, wherein the at least one complex alkaline fluoride is chosen from the group $Na_3AlF_6$, $K_2NaAlF_6$, $Na_2SiF_6$, $K_2SiF_6$, $NaBF_4$ and $KBF_4$.

10. The abrasive grains according to claim 9, wherein the binder additionally comprises fillers and/or grinding additives, chosen from the group of sulfides, phosphates, carbonates, and/or halogenides, and/or sulfide, phosphate, carbonate and/or halogenide-containing complex compounds from the group of elements: Na, Li, K, Mg, Ca, Al, Mn, Cu, Sn, Fe, Ti, Sb and/or Zn.

11. The abrasive grains according to claim 10, wherein the micro-particle inorganic powder is an oxide pigment.

12. The abrasive grains according to claim 11, wherein the coating encompasses approximately 0.002 to approximately 5.0 percent by weight of micro-particle inorganic powder, based on the untreated abrasive grain.

13. The abrasive grains according to claim 12, wherein the coating preferably encompasses approx. 0.1 to approximately 2.0 percent by weight of micro-particle inorganic powder, based on the untreated abrasive grain.

14. The abrasive grains according to claim 13, wherein the binder is hardened when heated to a temperature of <400° C.

15. The abrasive grains according to claim 2, wherein the portion of the binder is approximately 0.01 to approximately 10.0 percent by weight, based on the untreated abrasive grain.

16. The abrasive grains according to claim 3, wherein the portion of the binder is approximately 0.01 to approximately 10.0 percent by weight, based on the untreated abrasive grain.

17. The abrasive grains according to claim 16, wherein the binder is made up of approximately 0.005 to approximately 4.0 percent by weight of water, approximately 0.0005 to approximately 1.0 percent by weight of aluminosilicate and approximately 0.001 to approximately 1.0 percent by weight of alkaline fluoride, in each case based on the untreated abrasive grain.

18. The abrasive grains according to claim 2, wherein the binder is made up of approximately 0.005 to approximately 4.0 percent by weight of water, approximately 0.0005 to approximately 1.0 percent by weight of aluminosilicate and approximately 0.001 to approximately 1.0 percent by weight of alkaline fluoride, in each case based on the untreated abrasive grain.

19. The abrasive grains according to claim 1, wherein the aluminosilicate is chosen from at least one of the group consisting of metakaolins, flue ashes, slags, fine sands and activated clays.

20. The abrasive grains according to claim 19, wherein the aluminosilicate comprises a product of reactive $Al_2O_3$, and reactive $SiO_2$, which was created in situ in response to the coating reaction.

21. The abrasive grains according to claim 1, wherein the aluminosilicate comprises a product of reactive $Al_2O_3$, and reactive $SiO_2$, which was created in situ in response to the coating reaction.

22. The abrasive grains according to claim 21, wherein the aluminosilicate is a gel formed by polycondensation of reactive $Al_2O$ and reactive $SiO_2$ comprising a three-dimensional network consisting of $SiO_4$ and $AlO_4$ tetrahedrons.

23. The abrasive grains according to claim 1, wherein the aluminosilicate is a gel formed by polycondensation of reactive $Al_2O$ and reactive $SiO_2$ comprising a three-dimensional network consisting of $SiO_4$ and $AlO_4$ tetrahedrons.

24. The abrasive grains according to claim 23, wherein the at least one complex alkaline fluoride is chosen from the group $Na_3AlF_6$, $K_2NaAlF_6$, $Na_2SiF_6$, $K_2SiF_6$, $NaBF_4$ and $KBF_4$.

25. The abrasive grains according to claim 2, wherein the at least one complex alkaline fluoride is chosen from the group $Na_3AlF_6$, $K_2NaAlF_6$, $Na_2SiF_6$, $K_2SiF_6$, $NaBF_4$ and $KBF_4$.

26. The abrasive grains according to claim 1, wherein the binder additionally comprises fillers and/or grinding additives, chosen from the group of sulfides, phosphates, carbonates, halogenides, and/or sulfide, phosphate, carbonate and/or halogenide-containing complex compounds from the group of elements: Na, Li, K, Mg, Ca, Al, Mn, Cu, Sn, Fe, Ti, Sb and/or Zn.

27. The abrasive grains according to claim 1, wherein the micro-particle inorganic powder is an oxide pigment.

28. The abrasive grains according to claim 1, wherein the coating encompasses approximately 0.002 to approximately 5.0 percent by weight of micro-particle inorganic powder, based on the untreated abrasive grain.

29. The abrasive grains according to claim 1, wherein the coating preferably encompasses approximately 0.1 to approximately 2.0 percent by weight of micro-particle inorganic powder, based on the untreated abrasive grain.

30. The abrasive grains according to claim 1, wherein the binder is hardened by heating it to a temperature of <400° C.

31. A method for producing abrasive grains according to claim 1, comprising the steps:
wetting the abrasive grains with a binder in an intensive mixer;
adding a micro-particle inorganic powder to the wetted abrasive grains;
mixing the abrasive grains with the micro-particle inorganic powder until the powder is homogeneously distributed on the surface of the abrasive grains thereby coating said abrasive grains, and
heating the coating at a temperature of <400° C., which hardens the coating; wherein the binder comprises:
aluminosilicate with a molar ratio of $Al_2O_3$ to $SiO_2$ of 1:2 to 1:20,
sodium silicate, and
water, and
the precursor to the binder is a water-diluted base mixture of approximately 60 percent to approximately 90 percent by weight of water.

32. The method according to claim 31, wherein the binder additionally comprises at least one complex alkaline fluoride.

33. The method according to claim 31, wherein the chemical composition of the precursor to the binder is approximately 5 to approximately 30 percent by weight of $SiO_2$, approximately 1 to approximately 10 percent by weight of $Al_2O_3$ and approximately 5 to approximately 15 percent by weight of alkaline fluoride is used.

34. The abrasive grains according to claim 1, wherein the binder further comprises at least one complex alkaline fluoride selected from the group consisting of $K_2SiF_6$ and $Na_3AlF_6$.

* * * * *